(12) United States Patent
Nakahara et al.

(10) Patent No.: US 8,852,352 B2
(45) Date of Patent: Oct. 7, 2014

(54) METHOD OF CLEANING AIR DIFFUSER APPARATUS

(75) Inventors: Yoshihito Nakahara, Toyohashi (JP); Tetsuya Torichigai, Toyohashi (JP); Hirouki Okazaki, Toyohashi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 620 days.

(21) Appl. No.: 12/667,646

(22) PCT Filed: Jul. 4, 2007

(86) PCT No.: PCT/JP2007/063380
§ 371 (c)(1),
(2), (4) Date: Mar. 3, 2010

(87) PCT Pub. No.: WO2009/004725
PCT Pub. Date: Jan. 8, 2009

(65) Prior Publication Data
US 2010/0186777 A1    Jul. 29, 2010

(51) Int. Cl.
*B08B 9/032* (2006.01)
*B08B 3/02* (2006.01)
*B08B 3/04* (2006.01)
*B08B 5/02* (2006.01)
*B01D 61/18* (2006.01)
*B01D 65/02* (2006.01)
*C02F 3/12* (2006.01)
*B01D 63/02* (2006.01)

(52) U.S. Cl.
CPC ............ *B01D 65/027* (2013.01); *B01D 61/18* (2013.01); *C02F 3/1273* (2013.01); *B01D 2315/06* (2013.01); *C02F 2303/16* (2013.01); *B01D 63/026* (2013.01); *B01D 2321/185* (2013.01)
USPC .................. 134/22.12; 134/22.18

(58) Field of Classification Search
USPC .............................. 134/22.12, 22.18; 261/124
See application file for complete search history.

(56) References Cited

U.S. PATENT DOCUMENTS 5,597,491 A * 1/1997 Winkler ......................... 210/754
5,639,373 A * 6/1997 Mahendran et al. .......... 210/636
(Continued)

FOREIGN PATENT DOCUMENTS

JP    10-296252    11/1998
JP    10-314732    12/1998
(Continued)

OTHER PUBLICATIONS

Machine translation of JP 2003-154236; Honjo et al.; May 27, 2003.*
(Continued)

*Primary Examiner* — Michael Kornakov
*Assistant Examiner* — Natasha Campbell
(74) *Attorney, Agent, or Firm* — Fitch, Even, Tabin & Flannery, LLP

(57) ABSTRACT

An air diffuser apparatus component in a membrane filtration unit including an air main pipe connected to an aeration blower(s), liquid supply piping that joins the air main pipe in midstream, a branch conduit horizontally connected through a gas supply pipe branched from the air main pipe, and a plurality of air diffusion pipes horizontally to the branch pipe conduit, each diffusion pipe having diffusion holes opening substantially vertically downward, is cleaned. This involves setting a gas flow rate in the branch pipe conduit in a range of 1 m/sec or more and 8 m/sec or less, and a liquid supply rate in the branch pipe conduit in a range from 0.03 L/min/mm² to 0.2 L/min/mm². This solid sludge clogging diffusion holes to be efficiently removed with a gas-liquid mixing fluid without stopping for a drainage treatment.

11 Claims, 4 Drawing Sheets

(56) References Cited

U.S. PATENT DOCUMENTS

| | | | |
|---|---|---|---|
| 5,897,771 A | * | 4/1999 | Yoshimura .................... 210/150 |
| 2003/0001295 A1 | * | 1/2003 | Okajima et al. .............. 261/124 |

FOREIGN PATENT DOCUMENTS

| | | |
|---|---|---|
| JP | 11-244674 A | 9/1999 |
| JP | 2001-276875 A | 10/2001 |
| JP | 2003-154236 A | 5/2003 |
| JP | 2007-167774 | 7/2007 |
| JP | 2007-209948 | 8/2007 |
| WO | WO 99/29630 A1 | 6/1999 |

OTHER PUBLICATIONS

Machine translation of JP 2001-276875; Nagano et al.; Oct. 9, 2001.*
International Search Report dated Oct. 1, 2007, For PCT/JP2007/063380.

* cited by examiner

Prior Art

Prior Art

METHOD OF CLEANING AIR DIFFUSER APPARATUS

This application is the U.S. National Stage of PCT/JP2007/063380, filed Jul. 4, 2007, the complete disclosure of which is incorporated herein by reference.

TECHNICAL FIELD

The present invention relates to a method of cleaning an air diffuser apparatus of a membrane filtration unit that is immersed in a treatment liquid in an aeration tank usually used in a drainage treatment, a water purification treatment, and a membrane separation activated sludge treatment.

BACKGROUND ART

In a membrane separation activated sludge treatment method that is of a typical example to which the apparatus of the invention is applied, for example, an organic material contained in industrial wastage or living drainage or drainage containing microorganisms or bacteria is biologically treated, solid-liquid separation is performed using various separation membranes, and treated water is recovered in a treated water tank or discharged. A usual membrane separation activated sludge treatment apparatus includes a raw water regulating tank, a denitrification tank, and an aeration tank. In the raw water regulating tank, a liquid level in the tank is measured with a liquid-level meter, and a liquid sending pump is intermittently driven to adjust a liquid-level height in the tank within a predetermined range. After raw water sent by a liquid sending pump is introduced to the denitrification tank, the raw water overflowing from the denitrification tank is caused to flow in the aeration tank. A membrane filtration unit is immersed in the aeration tank. The membrane filtration unit performs the membrane separation of the raw water into treated water and a contaminant of activated sludge, the filtrated treated water is sucked by a suction pump, and the treated water is recovered in the treated water tank or discharged. A large proportion of the excess sludge in the aeration tank is sent to a sludge storage tank and incinerated after dried. Part of the excess sludge is sent back to the denitrification tank by the liquid sending pump to circulate between the denitrification tank and the aeration tank.

A typical example of the membrane filtration unit includes a hollow fiber membrane module and an air diffuser apparatus. A plurality of sheet-like hollow fiber membrane elements are arranged at predetermined intervals in the hollow fiber membrane module, and many pieces of porous hollow fiber are arranged in parallel in the same plane in the hollow fiber membrane element. The air diffuser apparatus is disposed below the hollow fiber membrane module. A whole shape of the hollow fiber membrane module including the plurality of hollow fiber membrane elements is formed into a substantially rectangular solid. In the air diffuser apparatus, a plurality of air diffusion pipes are provided in parallel, and one end of each air diffusion pipe is connected to air supply piping of an aeration blower. The air diffusion pipe is made of metal or resin, and holes or slits are provided in the air diffusion pipe. The air delivered from the aeration blower is discharged in the sludge through the air diffuser apparatus.

The air discharged from the air diffuser apparatus becomes a bubble and rises, and the air and the surrounding sludge are mixed to become a gas-liquid mixing flow, thereby swinging the hollow fiber membrane element of the hollow fiber membrane module located above. The sludge adhering to a membrane surface of the hollow fiber membrane element is peeled off from the membrane surface by the swing of the hollow fiber membrane element to perform so-called air scrubbing cleaning that suppresses clogging of the membrane surface. When the living drainage or plant wastage is treated, air generated from the air diffuser apparatus is brought into contact with the organic material in the sludge of the aeration tank under the existence of the aerobic microorganisms, and the organic material is absorbed and metabolism-resolved by the aerobic microorganisms, thereby performing the biological sludge treatment.

The hollow fiber membrane module and the air diffuser apparatus are surrounded by a rectangular tubular closure plate whose upper and lower ends are opened. A gas-liquid mixing flow is generated by rise of a bubble generated from the air diffuser apparatus, and the closure plate is used as a wall portion that guides the gas-liquid mixing flow from an upward flow to a downward flow. The gas-liquid mixing flow that generated by the bubble discharged from the air diffuser apparatus is not dispersed in an oblique direction, but the gas-liquid mixing flow rises straight to efficiently come into contact with the hollow fiber membrane module. At this point, the hollow fiber membrane is swung by the even dispersion of the gas-liquid mixing flow with respect to the membrane surface of the hollow fiber membrane module to evenly clean each hollow fiber membrane element. Then, the gas-liquid mixing flow flows to the surroundings beyond an upper-end portion of the closure plate, and the gas-liquid mixing flow comes down to form a vertical swirling flow as a whole. The activated sludge is stirred by the swirling flow to homogenize the biological treatment.

A membrane separation module including a filtration membrane having a plurality of fine holes is also used in addition to the sheet-like hollow fiber membrane element including the porous hollow fiber is used as the component. For example, there are various known separation membranes such as a planar membrane type, a tubular membrane type, and a saclike membrane type. Examples of the material for the separation membrane include cellulose, polyolefin, polysulphone, PVDF (polyvinylidene fluoride), PTFE (polytetrafluoroethylene), and ceramics. The hollow fiber membrane module in which the hollow fiber membrane element is utilized is frequently used because of a wide filtration area.

As to an average diameter of the fine hole of the porous hollow fiber, generally the average diameter ranges from 0.001 to 0.1 μm in a generally-called ultrafiltration membrane, and the average diameter ranges from 0.1 to 1 μm in a generally-called microfiltration membrane. For example, preferably the hole diameter is equal to or less than 0.5 μm when the membrane separation module is used in solid-liquid separation of the activated sludge, and preferably the hole diameter is equal to or less than 0.1 μm when sterile filtration is required like water purification.

DISCLOSURE OF THE INVENTION

Problems to be Solved by the Invention

A plurality of diffusion holes opened vertically downward are formed in the air diffusion pipe formed by a metal pipe or a synthetic resin pipe in the air diffuser apparatus. Accordingly, the air is discharged vertically downward into the sludge from the air diffuser apparatus through each air diffusion pipe, and the air rises while becoming the bubble. However, the excess sludge exists mainly in a lower portion of the air diffuser apparatus, and the sludge flows toward the air diffusion pipe. Therefore, the sludge adheres to a circumferential surface of each air diffusion pipe, the adhesion sludge eventually closes the opening of the air diffusion pipe, and sometimes the air diffusion becomes impossible. In order to prevent the problem, the air diffusion pipe is conventionally cleaned.

For example, while the operations of the suction pump or the aeration blower is stopped, the air diffuser apparatus is raised from the tank to clean the air diffusion pipe, a spirometer provided in the aeration blower sucks and removes the adhesion sludge, or the liquid is delivered in the air diffusion pipe to remove the clogging sludge by the liquid pressure. However, when the drainage treatment is completely stopped at least temporarily, because a decrease in treatment efficiency is caused, the complete stopping of the drainage treatment should be avoided as much as possible.

The present invention has been made in view of the above problem, and an object of the invention is to provide a method of cleaning the air diffuser apparatus in recovering the filtrate of the solid-liquid mixing treatment liquid, in which the air diffusion pipe can be cleaned at any time without stopping the drainage treatment.

Means for Solving the Problems

The problem is effectively solved by a method of cleaning an air diffuser apparatus, which is a basic configuration of the invention, in which a membrane filtration unit is disposed in a treatment tank while immersed, the membrane filtration unit including a membrane separation module and an air diffuser apparatus disposed below the membrane separation module, a liquid to be treated is filtrated by the membrane separation module at the same time as air is diffused by the air diffuser apparatus, and filtrate is recovered from the membrane separation module, the method of cleaning an air diffuser apparatus characterized in that the air diffuser apparatus includes: at least one gas supply piping; a liquid supply piping that joins in midstream of the gas supply piping; a horizontal distribution pipe that is connected through a branch pipe conduit branched from the gas supply piping; and a plurality of air diffusion pipes that are horizontally disposed perpendicular to the horizontal distribution pipe, each air diffusion pipe having a plurality of diffusion holes that are opened substantially vertically downward, a gas flow rate in the branch pipe conduit is set to a range of 1 m/sec or more and 8 m/sec or less, and a liquid supply rate in the branch pipe conduit is set to a range 0.03 L/min/mm$^2$ or more and 0.2 L/min/mm$^2$ or less.

At this point, more preferably the gas flow rate in the gas supply piping is set to a range of 2 m/sec or more and 5 m/sec or less, and more preferably the liquid supply rate is set to a range of 0.05 L/min/mm$^2$ or more and 0.15 L/min/mm$^2$ or less.

According to the preferred aspect of the invention, the sum of opening areas of the diffusion holes in each air diffusion pipes is set to smaller than a sectional opening area of the air diffusion pipe. Further, preferably a value in which the sectional opening area of each air diffusion pipe is multiplied by the number of air diffusion pipes is set smaller than a value in which the sectional opening area of each branch pipe conduit is multiplied by the number of branch pipe conduits.

Effects of the Invention

As can be understood from the configuration, in a basic idea of the method of cleaning an air diffuser apparatus of the invention, the liquid is mixed in the gas delivered from the aeration blower to the air diffuser apparatus, the gas-liquid mixing flow is delivered to the air diffusion pipe, and the liquid pressure of the gas-liquid mixing flow and the adhesion sludge are dissolved and blown, thereby opening the diffusion hole closed by the adhesion sludge. At this point, although the liquid can be continuously supplied to the gas while the drainage is treated, an electromagnetic opening/closing valve may be mounted on the liquid supply piping to supply the liquid at predetermined intervals based on a signal from a control unit.

For example, in the membrane separation activated sludge treatment, the filtration operation is intermittently performed in order to clean the membrane module of the membrane filtration unit. Specifically, the filtration operation is stopped for 1 minute after the filtration operation is performed for 6 minutes, and the operations are repeated. When the method of cleaning an air diffuser apparatus of the invention is applied in stopping the filtration operation, the cleaning can be performed while the drainage treatment is continuously performed.

At this point, when the liquid (water or treated water) joins to the air through the gas supply pipe conduit while the air is delivered from the aeration blower to the air diffuser apparatus through the gas supply pipe conduit, the liquid and the air are mixed together, and the gas flows in the air diffusion pipe while becoming the large bubble. Part of the air in the gas-liquid mixing flow rises through the liquid in the air diffusion pipe and collects in the upper inner-wall portion of the air diffusion pipe, and the liquid is pressed against the lower inner-wall portion by the internal pressure of the air, thereby bringing a large amount of liquid into contact with the adhesion sludge. At this point, the bubble in the liquid is simultaneously dispersed to promote the dissolution of the adhesion sludge. When the flow rate of the gas flowing in the branch pipe conduit exceeds 8 m/sec, a downstream-side liquid of the horizontal distribution pipe is pressed by the gas, and the amount of downstream-side liquid is increased larger than the amount of upstream-side liquid. Usually, the air diffusion pipes are horizontally mounted into a ladder shape on the gas distribution pipe. As described above, because the amount of liquid on the downstream side of the horizontal distribution pipe is increased when the gas flow rate exceeds 8 m/sec, the gas-liquid mixture cleaning of the air diffusion pipe provided on the downstream side exceeds the gas-liquid mixture cleaning of air diffusion pipe on the upstream side, and the cleaning unevenness is generated in the length direction of the horizontal distribution pipe. Therefore, even cleaning cannot be performed. On the other hand, when the gas flow rate is lower than 1 m/sec, the gas supply rate decreases on the downstream side, and the even cleaning cannot be performed because the unevenness of the cleaning is generated in the length direction of the horizontal distribution pipe.

When the fluid supply rate is smaller than 0.03 L/min/mm$^2$, the moistening (dissolving) of the adhesion sludge does not advance, and the cleaning effect is largely degraded. When the fluid supply rate is larger than 0.2 L/min/mm$^2$, although the moistening of the adhesion sludge advances sufficiently, the excessive amount of fluid is returned to the air diffusion pipe, which results in a trouble with economic efficiency.

The sum of opening areas of the diffusion holes in each air diffusion pipe is set smaller than a sectional opening area of the air diffusion pipe, whereby the fluid pressure in the air diffusion pipe easily crushes the adhesion sludge. At this point, when a value in which the sectional opening area of each air diffusion pipe is multiplied by the number of air diffusion pipes is set smaller than a value in which the sectional opening area of each branch pipe conduit is multiplied by the number of branch pipe conduits, the fluid pressure necessary to crush the adhesion sludge in the air diffusion pipe is easily obtained for the similar reason.

EXPLANATIONS OF REFERENCE NUMERALS

Figure 1:
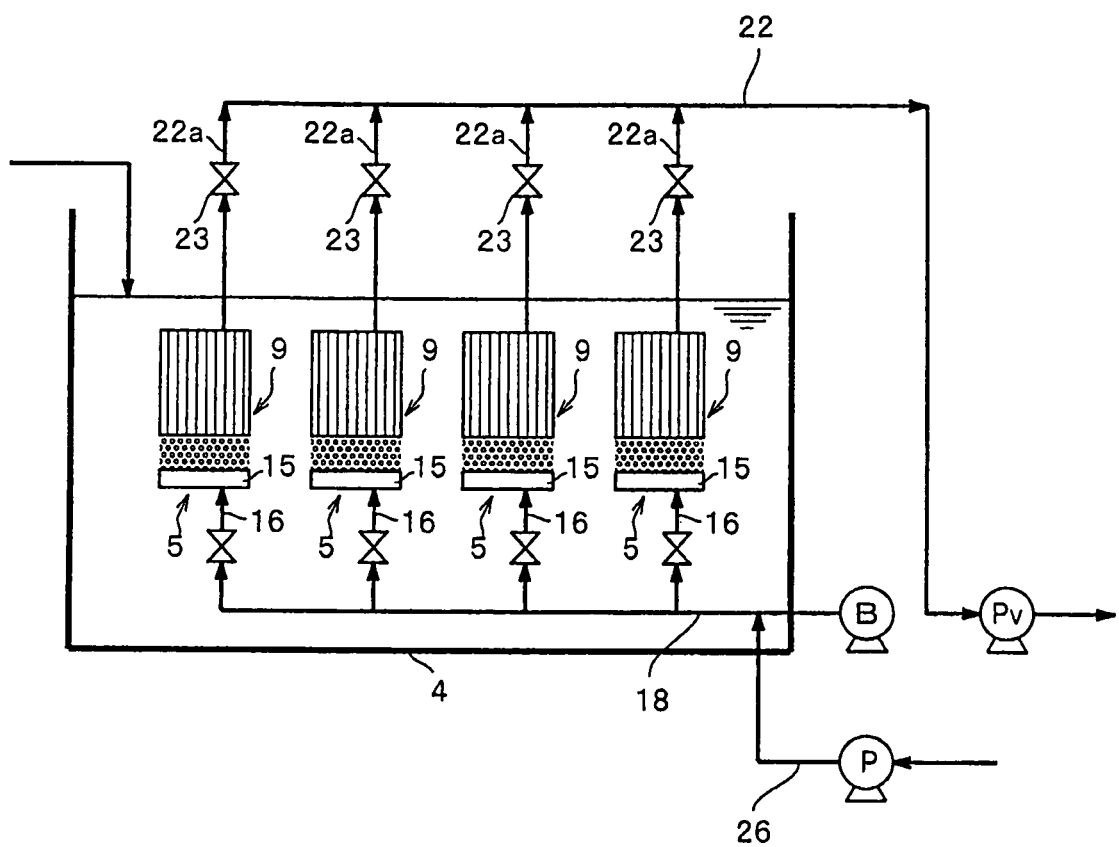
FIG. 1 is an explanatory view illustrating a schematic configuration of a filtrate water recovery apparatus to which a method of cleaning an air diffuser apparatus according to an exemplary embodiment of the invention is applied.

4: Aeration tank
5: Membrane filtration unit
9: Hollow fiber membrane module
10: Hollow fiber membrane element
10a: Porous hollow fiber
11: Membrane sheet
11a: Potting material
12: Filtrate water extraction pipe
12a: Filtrate water extraction port
12b: L-shape joint
13: Lower frame
14: Vertical rod
15: Air diffuser apparatus
16: Gas supply pipe
17: Air diffusion pipe
18: Air main pipe
20: Upper wall material
21: Water catchment header pipe
21a: Water catchment port
21b: L-shape joint
21c: Water suction port
22: Suction pipe
22a: Suction conduit
23: Flow regulating valve
24: Lower wall material
24a: Support post
25: Branch pipe conduit
26: Liquid supply pipe
Pv: Suction pump
B: Aeration blower

BEST MODE FOR CARRYING OUT THE INVENTION

A preferred embodiment of the present invention will be specifically described below with reference to the drawings. FIG. 1 illustrates a schematic configuration of an aeration process in a membrane separation activated sludge treatment apparatus in which a method of cleaning an air diffuser apparatus according to an embodiment of the invention is suitably performed in recovering a filtrate of a solid-liquid mixing treatment liquid.

In the membrane separation activated sludge treatment apparatus, after the raw water introduced to a raw water regulating tank (not illustrated) is intermittently introduced to a denitrification tank (not illustrated) by a liquid sending pump (not illustrated) such that a predetermined liquid-level range is maintained, the raw water overflowing from the denitrification tank is caused to flow in an aeration tank 4. A plurality of membrane filtration units 5 are disposed in sludge of the aeration tank 4 while immersed. The raw water is membrane-separated into activated sludge and treated water by the membrane filtration unit 5, and the treated water is sent and recovered into a treated water tank by suction of a suction pump Pv, or the treated water is directly discharged. On the other hand, part of concentrated sludge including microorganisms proliferated through an aeration treatment in aeration tank 4 is stored in a sludge storage tank (not illustrated). Part of the concentrated sludge in the aeration tank 4 is also sent back to the denitrification tank to circulate between the denitrification tank and the aeration tank by the liquid sending pump (not illustrated).

Figure 2:
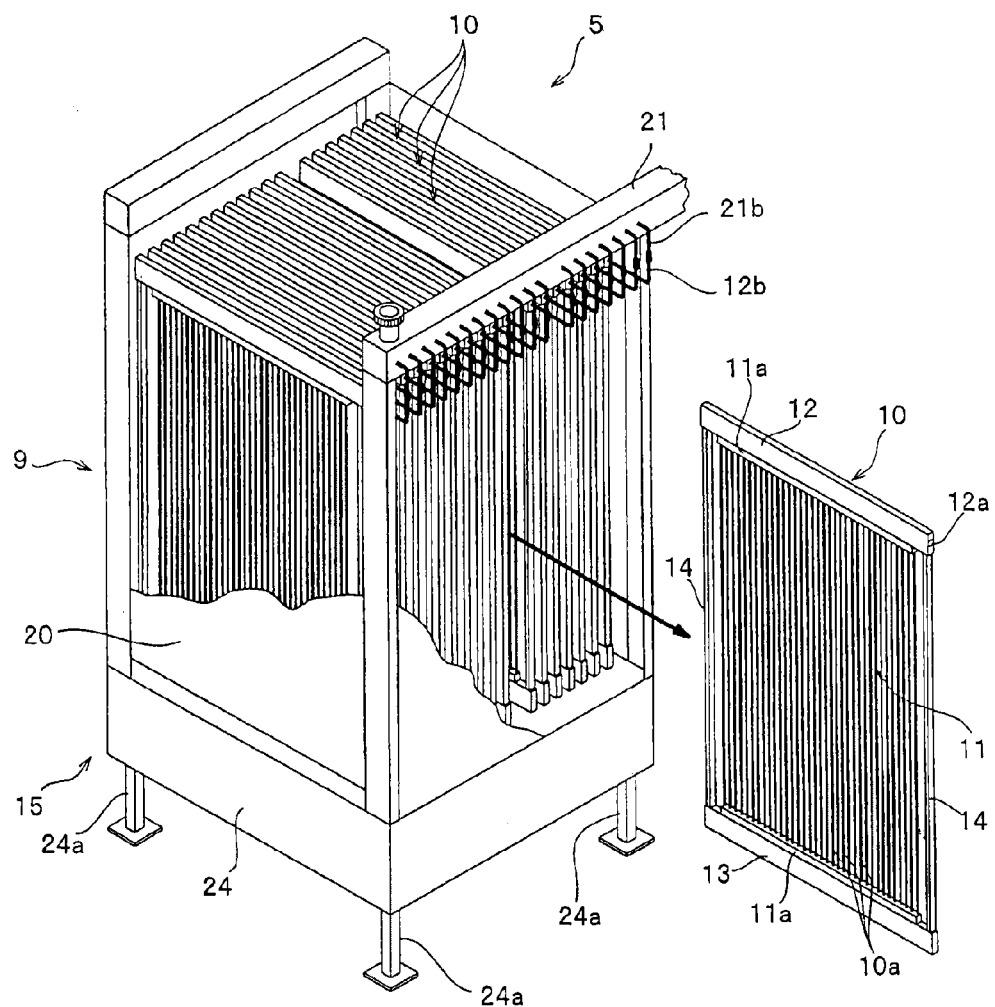
FIG. 2 is a partially broken diagram illustrating an entire configuration of a usual membrane filtration unit.
Figure 3:
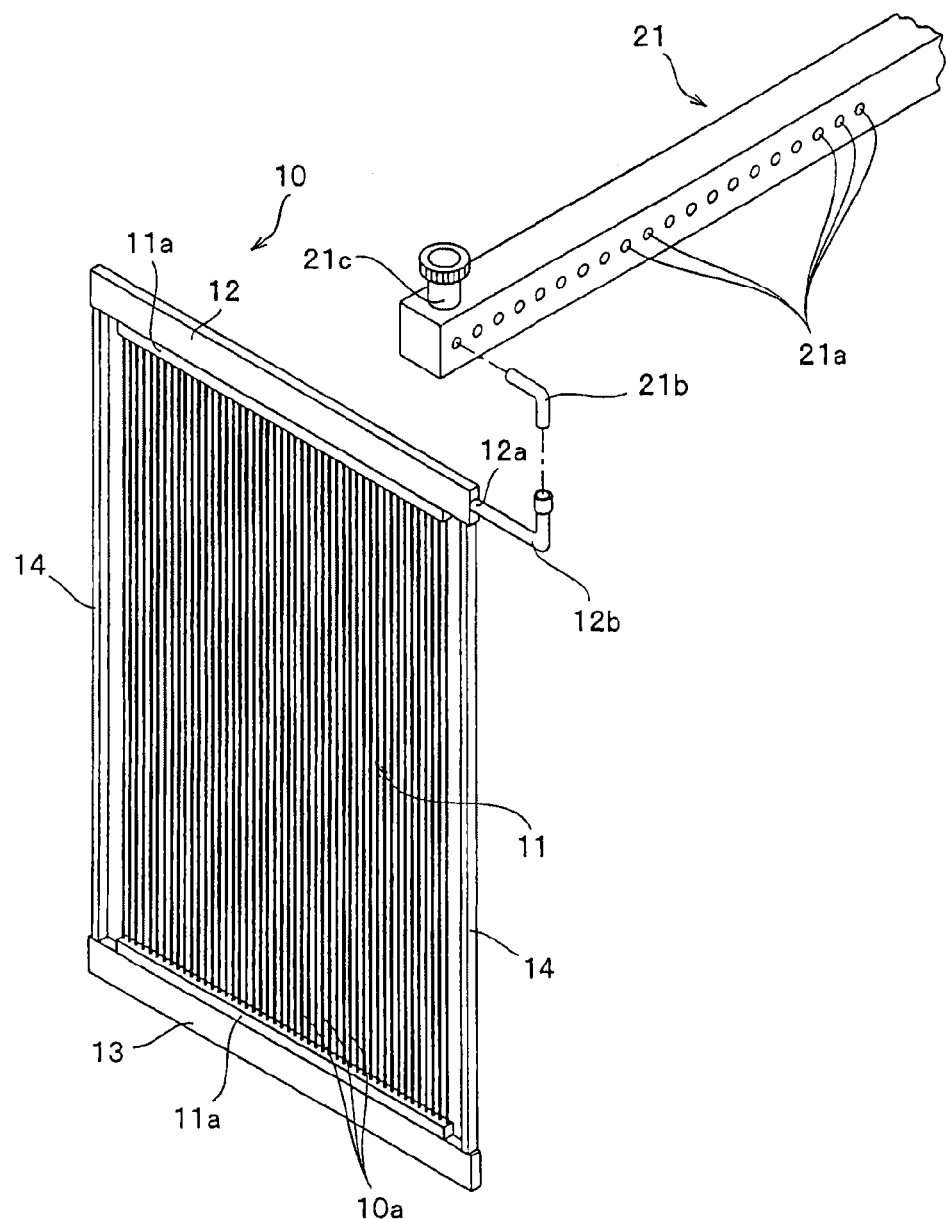
FIG. 3 is a perspective view schematically illustrating a configuration example of a membrane element that is of a component of a hollow fiber membrane module.

FIG. 2 illustrates a typical example of the usual membrane filtration unit 5. As illustrated in FIG. 2, the membrane filtration unit 5 includes a hollow fiber membrane module 9 and an air diffuser apparatus 15. A plurality of hollow fiber membrane elements 10 in which a fiber length direction is perpendicularly disposed are supported by and fixed to the hollow fiber membrane module 9 while disposed in parallel. The air diffuser apparatus 15 is disposed below the hollow fiber membrane module 9 with a predetermined interval. In the hollow fiber membrane element 10, an upper-end opening end portion of a membrane sheet 11 in which many pieces of porous hollow fiber 10a are arranged in parallel is communicated with and supported by a filtrate water extraction pipe 12 through a potting material 11a, a lower end of the membrane sheet 11 is closed while fixed to and supported by a lower frame 13 through the potting material 11a, and both ends of each of the filtrate water extraction pipe 12 and the lower frame 13 are supported by a pair of vertical rods 14. The many hollow fiber membrane elements 10 are accommodated in a substantially whole volume of a rectangular tubular upper wall material 20 while supported in parallel. In the rectangular tubular upper wall material 20, sheet surfaces are vertically provided, and upper and lower end faces are opened. At this point, as illustrated in FIG. 3, in the hollow fiber membrane element 10, generally many pieces of porous hollow fiber 10a are disposed in parallel in the same plane at equal intervals.

In the embodiment, porous hollow fiber made of PVDF (polyvinylidene fluoride) is used as the porous hollow fiber 10a, the porous hollow fiber 10a is formed hollow in a length direction along a center portion, and a filtration hole of the porous hollow fiber 10a has a diameter of 0.4 µm. The hollow fiber membrane element 10 has an effective membrane area of 25 m² per sheet. The 20 sheet-like hollow fiber membrane elements 10 are used per one membrane filtration unit 5. As to dimensions of the hollow fiber membrane element 10, a depth is 30 mm, a width is 1250 mm, and a length from an upper surface of the filtrate water extraction pipe 12 to a lower surface of the lower frame 13 is 2000 mm. One membrane filtration unit 5 including the air diffuser apparatus 15 has a depth of 1552.5 mm, a width of 1447 mm, and a height of 3043.5 mm. The filtrate water extraction pipe 12 has a length of 1280 mm, the filtrate water extraction pipe 12 is made of ABS resin, and the vertical rod 14 is made of SUS304.

However, materials for the porous hollow fiber 10a, the filtrate water extraction pipe 12, and the vertical rod 14, dimensions of the hollow fiber membrane element 10, dimensions of the membrane filtration unit 5, and the number of hollow fiber membrane elements 10 per one membrane filtration unit 5 can be varied depending on the intended use. For example, the number of hollow fiber membrane elements 10 can be arbitrarily set to 20, 40, 60, . . . according to the treatment amount, and conventionally known materials such as cellulose, polyolefin, polysulphone, polyvinyl alcohol, polymethylmethacrylate, and polyethylene fluoride can be applied to the material for the porous hollow fiber 10a.

An extraction port 12a for good-quality filtrate water (treated water) filtrated by each porous hollow fiber 10a is formed at one end of the filtrate water extraction pipe 12 of each hollow fiber membrane element 10. In the embodiment, as with the membrane filtration unit 5 of FIG. 2, an L-shape joint 12b is mounted on each extraction port 12a in a liquid-tight manner with a sealing material interposed therebetween. As illustrated in FIG. 3, a water catchment header pipe 21 is horizontally provided along an end edge on the side on which the extraction port 12a is formed at the upper end of the upper wall material 20. In the water catchment header pipe 21, a water catchment port 21a is formed at a position corresponding to each of the plurality of extraction ports 12a, and an L-shape joint 21b is mounted on each water catchment port 21a in a liquid-tight manner with a sealing material interposed therebetween like the extraction port 12a.

The L-shape joints 12b and 21b that are mounted on the treated water extraction port 12a of the filtrate water extraction pipe 12 and the water catchment port 21a of the water catchment header pipe 21 are connected to each other, whereby the treated water extraction port 12a and the water catchment port 21a are joined while water can be passed. A water suction port 21c connected to the suction pump Pv through filtrate water suction conduit 22 is formed in one-end portion of the water catchment header pipe 21. As illustrated in FIG. 1, a water suction port 21c formed in each water catchment header pipe 21 and the filtrate water suction pipe 22 are coupled to a flow regulating valve 23 that is interposed in a suction conduit 22a branched from the filtrate water suction pipe 22. At this point, the suction conduit 22a rises from the water catchment header pipe 21 to a position above a liquid level of the aeration tank 4, and the suction conduit 22a is connected to the horizontally-provided filtrate water suction pipe 22. In the embodiment, the filtrate water suction pipe 22 that is horizontally provided and extended to the outside of the tank is bent downward and connected to a suction port of the suction pump Pv that is installed on the ground. A drainage conduit is connected to a liquid discharge outlet of the suction pump Pv, and the filtrate water is delivered to the treated water tank (not illustrated) or the filtrate water is directly discharged.

Figure 4:
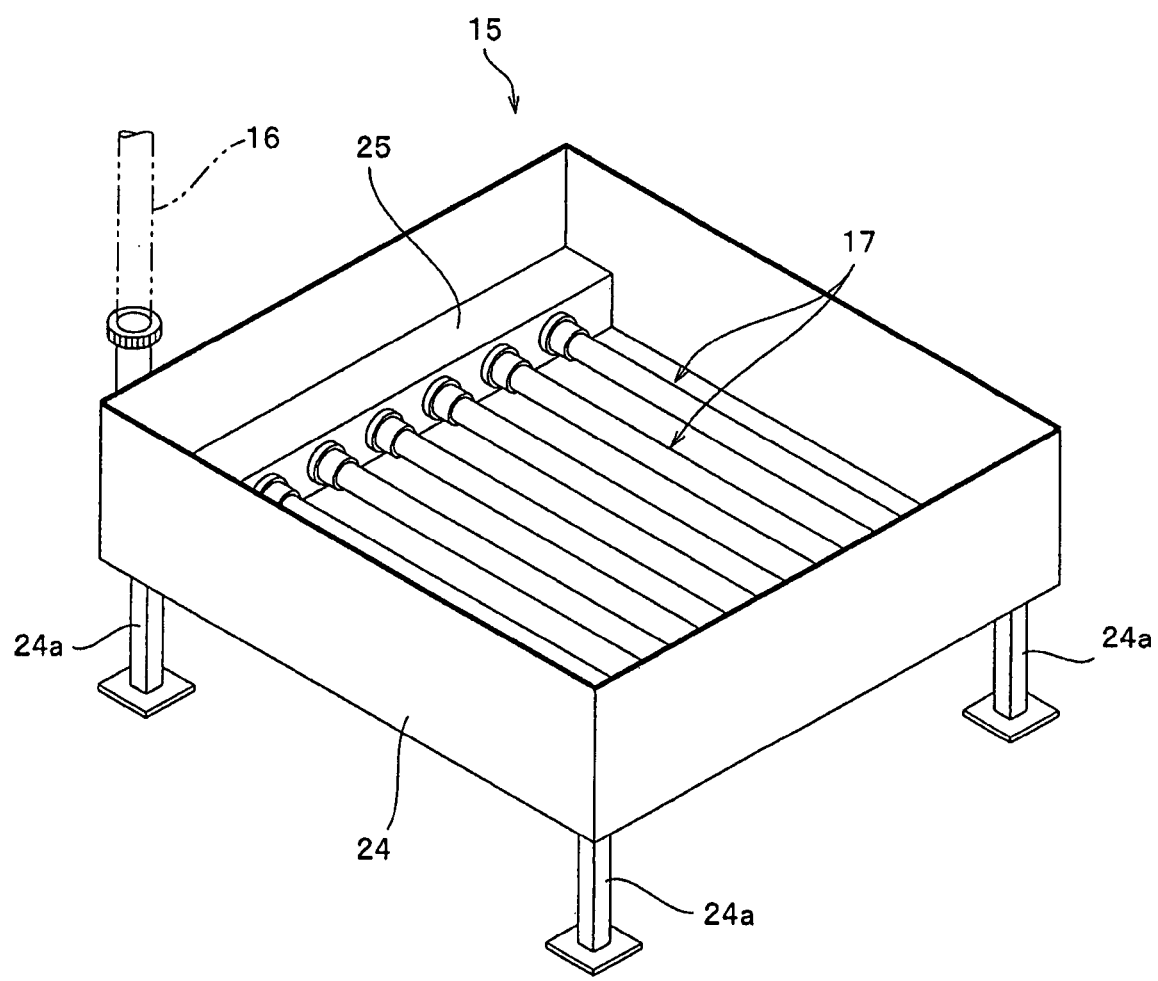
FIG. 4 is a diagram of an air diffuser apparatus that is of one of components of the membrane filtration unit.

As illustrated in FIG. 4, the air diffuser apparatus 15 includes a rectangular tubular body. The rectangular tubular body is joined to the lower end of the upper wall material 20, and upper and lower ends of the rectangular tubular body are opened. The air diffuser apparatus 15 is accommodated in and fixed to a bottom portion of a lower wall material 24, and the lower wall material 24 has four support posts 24a that are extended downward from lower ends at for corners of the lower wall material 24. As illustrated in FIG. 1, the air diffuser apparatus 15 is connected to the externally-provided aeration blower B through an air main pipe 18. Specifically, the air diffuser apparatus 15 includes a gas supply pipe 16 that is of a branch pipe conduit and the gas supply piping of the invention. An opening end of the gas supply pipe 16 is connected to a one-end portion of a branch pipe conduit 25 that is horizontally extended in a width direction along a front-face-side inner wall surface of the lower wall material 24, and a plurality of air diffusion pipes 17 are provided into a ladder shape at predetermined intervals in a length direction of the branch pipe conduit 25. One end of each of the air diffusion pipes 17 is communicated with and fixed to the branch pipe conduit 25, and the other end is horizontally fixed along an inner wall surface of the lower wall material 24 on the rear surface side.

In the embodiment, an end portion of the air diffusion pipe 17 on the side on which the air diffusion pipe 17 is connected to the gas supply pipe 16 is communicated with the inside of the gas supply pipe 16, and the other end of the air diffusion pipe 17 is closed. The air diffuser apparatus 15 of the embodiment is disposed according to the plurality of membrane filtration units 5, the air main pipe 18 directly connected to the aeration blower B is provided in order to branch the air delivered from the aeration blower B into each air diffuser apparatus 15, and the air main pipe 18 is connected to each air diffuser apparatus 15 through the gas supply pipe 16 that is of the branch pipe conduit.

A liquid supply pipe 26 joins to the air main pipe 18 or the gas supply pipe 16. A liquid sending pump (not illustrated) actively supplies a liquid to the liquid supply pipe 26 from a liquid (water or already-treated filtrate water) supply source (not illustrated). At this point, the liquid may be supplied while the suction pump Pv is driven, that is, the liquid sending may always be maintained while the filtration operation is performed or the liquid sending may be performed while the filtration operation is stopped.

As described above, the plurality of membrane filtration units 5 immersed in the same aeration tank 4 are connected to the same filtrate water suction pipe 22 through the suction conduit 22a and flow regulating valve 23. When the sludge treatment is continuously performed for a long period, because clogging advances in the surface of the filtration membrane of the membrane filtration unit 5, a decrease in filtration flow rate or an increase in differential pressure between the membranes is generated. In order to suppress the increase in differential pressure between the membranes, physical cleaning is performed. That is, so-called air scrubbing is performed by utilizing a gas-liquid mixing fluid of the sludge solution and the air blasting from the air diffuser apparatus 15 provided below the hollow fiber membrane element 10, and each piece of porous hollow fiber 10a is swung to peel off the sludge substance adhering to the membrane surface. At this point, a nitrification reaction is simultaneously activated by the microorganisms to perform the biological treatment.

The activated sludge of the aeration tank 4 is passed through the hollow portion of the porous hollow fiber 10a of the membrane filtration unit 5 to perform solid-liquid separation, the filtrate water is actively sucked by the external suction pump Pv, and the filtrate water is delivered to and recovered in the treated water tank (not illustrated). In the embodiment, the operation is repeatedly operated in such a way that, after the suction pump Pv is driven for 6 minutes, the suction pump Pv is stopped for 1 minute. That is, the suction pump Pv intermittently performs the suction of the filtrate water. The aeration blower B is continuously driven not only when the suction pump Pv is driven to perform the filtration operation but also when the suction pump Pv is stopped, the air is always delivered to the air diffuser apparatus 15. Therefore, not only when the suction pump Pv is driven to perform the filtration operation but also when the suction pump Pv is temporarily stopped, the hollow fiber membrane of the hollow fiber membrane module 9 is swung by an upward flow of the gas-liquid mixing fluid of bubbles and activated sludge discharged from the air diffuser apparatus 15, and the sludge substance adhering to the membrane surface is peeled off from the membrane surface to perform the so-called air scrubbing cleaning.

When the filtration operation of the suction pump Pv is stopped, the filtrate water suction is not performed from the hollow fiber membrane module 9, but only the air scrubbing is performed. At this point, in the air scrubbing, because the filtration suction is not performed to the porous hollow fiber 10a, the adhesion amount of the sludge substance is decreased. Therefore, the cleaning effect is extremely higher than that of the filtration operation, and a recovery speed of the differential pressure between the membranes is also enhanced. In the embodiment, the filtrate water is supplied to the air flowing in the air main pipe 18 or gas supply pipe 16 through the liquid supply pipe 26 in synchronization with the temporary stopping of the filtration operation. The gas-liquid mixing flow in which the filtrate water is supplied and mixed reaches the plurality of air diffusion pipes 17 through the branch pipe conduit 25 of the air diffuser apparatus 15.

At this point, part of the air in the gas-liquid mixing fluid delivered into the air diffusion pipe 17 collects in the upper surface of the filtrate water, that is, the upper inner wall portion of the air diffusion pipe 17, and an inner pressure is gradually increased to press the fluid against the lower inner wall portion of the air diffusion pipe 17. On the other hand, the air in the filtrate water becomes the bubble to flow in the filtrate water, and the air generates turbulence in the filtrate water. The adhesion sludge that consolidates to close the diffusion hole of the air diffusion pipe 17 is dissolved by the turbulence effect and the increase in inner pressure, and the sludge adhesion is pushed out from the diffusion hole to the activated sludge located outside the pipe to efficiently remove the adhesion sludge.

In the invention, it is necessary that a flow rate of filtrate water supplied from the fluid supply pipe is set to a range of 0.032 L/min/mm$^2$ or more and 0.2 L/min/mm$^2$ or less. More preferably, the filtrate water flow rate is set to the range of 0.05 L/min/mm$^2$ or more and 0.15 L/min/mm$^2$ or less. When the filtrate water supply rate is smaller than 0.03 L/min/mm$^2$, because a ratio of the liquid to the air becomes excessively small, the effect of the liquid cannot be expected, the moistening of the adhesion sludge does not advance, and the cleaning effect is largely degraded. When the filtrate water supply rate is larger than 0.2 L/min/mm$^2$, although the moistening of the adhesion sludge advances sufficiently, the excessive amount of filtrate water is returned to the air diffusion pipe, and the decrease in treatment recovery ratio or a trouble with economic efficiency is generated.

It is necessary that the flow rate of the air flowing in the branch pipe conduit 25 is set to a range of 1 m/sec or more and 8 m/sec or less. More preferably, the air flow rate is desirably set to the range of 2 m/sec or more and 5 m/sec or less. When the air flow rate exceeds 5 m/sec, sometimes the gas-liquid mixing flow on an entrance side of the branch pipe conduit 25 differs from the gas-liquid mixing flow on the downstream closed side of the branch pipe conduit 25 in an in-pipe height of the gas-liquid mixture by an influence of the gas flow rate. When the air flow rate exceeds 8 m/sec, the remarkable unevenness is observed, and the gas-liquid mixing flow on the downstream closed side becomes higher than the gas-liquid mixing flow on an entrance side in the in-pipe height. Thus, when the gas-liquid mixing flow on the downstream closed side becomes higher than the gas-liquid mixing flow on an entrance side in the in-pipe height, the air diffusion pipe 17 provided on the downstream closed side becomes higher than the air diffusion pipe 17 provided on the entrance side in a liquid height, a difference is generated among the inner wall surfaces and the diffusion holes of the air diffusion pipe for cleaning, and possibly the sludge adhesion cannot be partly removed.

On the contrary, when the gas flow rate is lower than 1 m/sec, the gas supply rate decreases on the downstream side, and the even cleaning cannot be performed because unevenness of the cleaning is generated in the length direction of the gas supply piping.

Further, in the embodiment, the sum of opening areas of the diffusion holes in the one air diffusion pipe 17 is set smaller than a sectional opening area of the air diffusion pipe 17. In the embodiment, one end of each air diffusion pipe 17 is connected and fixed to one branch pipe conduit 25. Alternatively, both ends of each air diffusion pipe 17 may be connected and fixed to two branch pipe conduits 25. It is necessary that a value in which the sectional opening area of the air diffusion pipe 17 is multiplied by the number of air diffusion pipes 17 is set smaller than a value in which the sectional opening area of the branch pipe conduit 25 is multiplied by the number of branch pipe conduits 25. When the opening areas are set based on the above-described relationships, the liquid and gas mixing effect is further enhanced, and the cleaning effect of the air diffuser apparatus 15 can be largely improved.

Examples of the invention will be specifically described below along with comparative examples.

Example 1

The air diffusion pipes having the inner diameter of 25 mm and the length of 1400 mm were connected and fixed at equal pitches between two parallel branch pipe conduits having the inner diameter of 100 mm and the length of 1400 mm. The nine diffusion holes having the diameter of 5 mm were made vertically downward with a pitch of 120 mm in the air diffusion pipe. The volume of air flowing in the gas distribution pipe was set to 200 m$^3$/hr, the volume of water in the gas distribution pipe was set to 100 L/min, and gas-liquid cleaning of the air diffusion pipe was performed 6 times/day for 1 minute (at this point, the gas flow rate was set to 7.1 m/sec, and the liquid supply rate was set to 0.2 L/min·mm$^2$). The closed state of the diffusion hole was visually inspected after the operation was performed for 6 months. As a result, the closed state was not recognized.

Example 2

Using the air diffusion pipe similar to that of Example 1, the volume of air flowing in the gas distribution pipe was set to 100 m$^3$/hr, the volume of water in the gas distribution pipe was set to 1000 L/min, and the gas-liquid cleaning of the air diffusion pipe was performed 6 times/day for 1 minute (at this point, the gas flow rate was set to 3.6 m/sec, and the liquid supply rate was set to 0.2 L/min·mm$^2$). The closed state of the diffusion hole was visually inspected after the operation was performed for 6 months. As a result, the closed state was not recognized.

Example 3

Using the air diffusion pipe similar to that of Example 1, the volume of air flowing in the gas distribution pipe was set to 50 m$^3$/hr, the volume of water in the gas distribution pipe was set to 100 L/min, and the gas-liquid cleaning of the air diffusion pipe was performed 6 times/day for 1 minute (at this point, the gas flow rate was set to 1.8 m/sec, and the liquid supply rate was set to 0.2 L/min·mm$^2$). The closed state of the diffusion hole was visually inspected after the operation was performed for 6 months. As a result, the closed state was not recognized.

Example 4

Using the air diffusion pipe similar to that of Example 1, the volume of air flowing in the gas distribution pipe was set to 200 m$^3$/hr, the volume of water in the gas distribution pipe was set to 50 L/min, and the gas-liquid cleaning of the air diffusion pipe was performed 6 times/day for 1 minute (at this point, the gas flow rate was set to 7.1 m/sec, and the liquid supply rate was set to 0.1 L/min·mm$^2$). The closed state of the diffusion hole was visually inspected after the operation was performed for 6 months. As a result, the closed state was not recognized.

Example 5

Using the air diffusion pipe similar to that of Example 1, the volume of air flowing in the gas distribution pipe was set to 200 m$^3$/hr, the volume of water in the gas distribution pipe was set to 15 L/min, and the gas-liquid cleaning of the air diffusion pipe was performed 6 times/day for 1 minute (at this point, the gas flow rate was set to 7.1 m/sec, and the liquid supply rate was set to 0.03 L/min·mm$^2$). The closed state of the diffusion hole was visually inspected after the operation was performed for 6 months. As a result, the closed state was not recognized although the sludge adhering to the inside of the air diffusion pipe was slightly recognized.

Comparative Example 1

The conditions were identical to those of Example 1 except that the water supply rate was set to 10 L/min (at this point, the gas flow rate was set to 7.1 m/sec, and the liquid supply rate was set to 0.02 L/min·mm$^2$). The closed state of the diffusion hole was visually inspected after the operation was performed for 6 months. As a result, the sludge adhering to the inside of the air diffusion pipe was recognized, and the closed state was recognized in each portion of the air diffusion pipe.

Comparative Example 2

The conditions were identical to those of Example 1 except that the air supply rate was set to 350 m$^3$/hr (at this point, the gas flow rate was set to 12 m/sec, and the liquid supply rate was set to 0.2 L/min·mm$^2$). The closed state of the diffusion hole was visually inspected after the operation was performed for 6 months. As a result, the sludge adhering to the inside of the air diffusion pipe was recognized, the closed state were also recognized at several points in the diffusion hole of the upstream-side air diffusion pipe.

The invention claimed is:

1. A method of cleaning air diffuser apparatuses in membrane filtration units in a treatment tank while immersed in a liquid to be treated, each membrane filtration unit having a membrane separation module and an air diffuser apparatus disposed below the membrane separation module, wherein the liquid to be treated is filtered by the membrane separation module at the same time as air is diffused by the air diffuser apparatus, and filtrate is recovered from the membrane separation module, each air diffuser apparatus including:
at least one air main pipe for receiving air blown from an aeration blower;
a gas supply pipe branched to each membrane filtration unit from said air main pipe;
a liquid supply pipe that joins in midstream of the air main pipe;
a branch pipe conduit connected through the gas supply pipe; and
a plurality of air diffusion pipes connected to the branch pipe conduit, the air diffusion pipes are horizontally disposed perpendicular to the branch pipe conduit, each air diffusion pipe having a plurality of diffusion holes that are opened substantially vertically downward,
said method comprising:
forming a gas-liquid mixing flow by mixing a liquid from the liquid supply pipe into the air in the air main pipe, and
delivering the gas-liquid mixing flow to the plurality of air diffusion pipes for unclogging diffusion holes in the air diffusion pipes,
wherein a gas flow rate in said branch pipe conduit is set to a range of 1 m/sec or more and 8 m/sec or less, and a liquid supply rate in the branch pipe conduit is set to a range of 0.03 L/min/mm$^2$ or more and 0.2 L/min/mm$^2$ or less.

2. The cleaning method according to claim 1, wherein the sum of opening areas of the diffusion holes in each air diffusion pipes is set to smaller than a sectional opening area of the air diffusion pipe.

3. The cleaning method according to claim 2, wherein a value in which the sectional opening area of each air diffusion pipe is multiplied by the number of air diffusion pipes is set smaller than a value in which the sectional opening area of each branch pipe conduit is multiplied by the number of branch pipe conduits.

4. The cleaning method according to claim 1, wherein a value in which the sectional opening area of each air diffusion pipe is multiplied by the number of air diffusion pipes is set smaller than a value in which the sectional opening area of each branch pipe conduit is multiplied by the number of branch pipe conduits.

5. The cleaning method according to claim 1, wherein the aeration blower is continuously driven not only while a filtration operation is performed but also while the filtration operation is stopped, and
wherein the liquid is mixed in the gas and the gas-liquid mixing flow is delivered to the plurality of air diffusion pipes not only while the filtration operation is stopped but also while the filtration operation is performed.

6. The cleaning method according to claim 1, wherein a filtration operation is periodically temporarily stopped, and said aeration blower is operated when a filtration operation is performed and when it is temporarily stopped whereby the liquid is mixed with the gas and the gas-liquid mixing flow is delivered to said air diffusion pipes.

7. The cleaning method according to claim 1, wherein said gas flow rate is set to a range from 2 m/sec to 5 m/sec.

8. The cleaning method according to claim 1, wherein said liquid supply rate is set to a range of from 0.05 L/min/mm$^2$ to 0.15 L/min/mm$^2$.

9. The cleaning method according to claim 1, wherein during said cleaning method the liquid from the liquid supply pipe comprises filtrate.

10. The cleaning method according to claim 1, wherein said gas flow rate is set to a range from 2 m/sec to 5 m/sec, and said liquid supply rate is set to a range of from 0.05 L/min/mm$^2$ to 0.15 L/min/mm$^2$.

11. The cleaning method according to claim 1, wherein the liquid supply rate is from 0.1 L/min/mm$^2$ to 0.2 L/min/mm$^2$, and the gas flow rate in the branch pipe conduit is from 1.8 m/sec to 7.1 m/sec.

* * * * *

UNITED STATES PATENT AND TRADEMARK OFFICE
CERTIFICATE OF CORRECTION

PATENT NO. : 8,852,352 B2  
APPLICATION NO. : 12/667646  
DATED : October 7, 2014  
INVENTOR(S) : Nakahara et al.

Page 1 of 1

It is certified that error appears in the above-identified patent and that said Letters Patent is hereby corrected as shown below:

On the title page (75) the third inventor's name should read "Hiroyuki OKAZAKI".

Signed and Sealed this  
Thirty-first Day of March, 2015

Michelle K. Lee  
*Director of the United States Patent and Trademark Office*